Sept. 26, 1939.  W. VAN B. ROBERTS  2,174,353

TRANSMISSION OF WAVES WITH ROTARY POLARIZATION
Filed May 6, 1937

INVENTOR
W. VAN B. ROBERTS
BY
ATTORNEY

Patented Sept. 26, 1939

2,174,353

UNITED STATES PATENT OFFICE 2,174,353

TRANSMISSION OF WAVES WITH ROTARY POLARIZATION

Walter van B. Roberts, Princeton, N. J., assignor to Radio Corporation of America, a corporation of Delaware Application May 6, 1937, Serial No. 141,022

3 Claims. (Cl. 250—11)

The object of this invention is to provide an antenna system that will transmit waves having rotary polarization.

A particular object is to transmit such waves uniformly in all directions in the horizontal plane or in all directions having a given angle of elevation above the horizontal.

A further object is to transmit such waves with approximately circular polarization.

Figure 1:
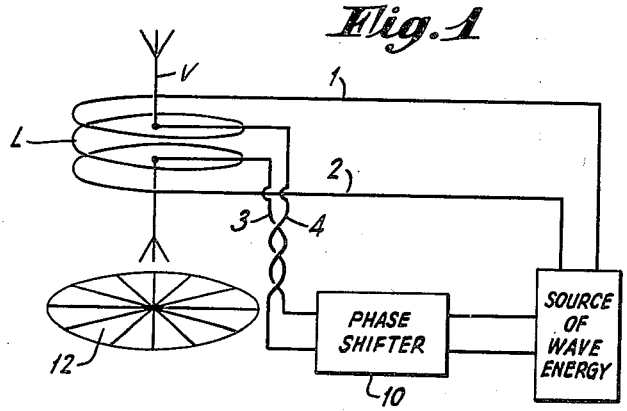
Figure 2:
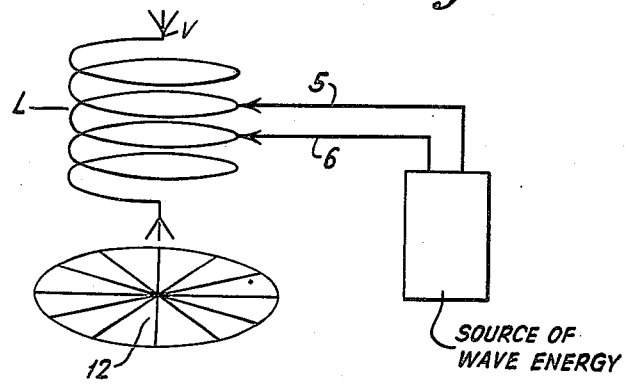

In describing my invention in detail reference will be made to the attached drawing wherein I have shown in Figure 1 an embodiment of my invention for producing waves substantially circularly polarized while in Figure 2 is shown a modification thereof.

Figure 1 shows an antenna arrangement suitable for the transmission of rotarily polarized waves. V is any suitable vertical type of open antenna driven for example by way of a transmission line 3, 4 in well known manner. This antenna emits vertically polarized waves uniformly in all directions about the vertical axis. L is a loop antenna having its axis vertical and energized through leads 1, 2 which emits waves having horizontal polarization, that is, with the electric vector horizontal and the magnetic vector vertical when measured in the equatorial plane. According to the invention the relative amounts of power fed to the two antennae (which are arranged concentrically) is adjusted so as to give the same field strength from each antenna at any distant point, and the phases of the currents fed to the two antennae are adjusted, say, by phase regulating means 10, so that at a distant point the two fields produced are 90° different in time phase. A phase regulating means of any type may be used. For example, I may use a phase regulating means as disclosed in my United States application #69,105 filed March 16, 1936.

As is well known the resultant of two equal magnitude vectors at right angles to each other in space and in time quadrature is a rotating vector of constant amplitude. Hence, the resultant wave emitted by the structure of Figure 1 is circularly polarized and of field strength which is uniform about the axis of the antenna structure although it falls off as the cosine of the angle of elevation above the horizontal plane.

So far the effect of reflected waves from the earth has been neglected. The effect of this reflection is to distort the circularity of the polarization and the law of falling off with increasing angles of elevation, but it does not affect the symmetry of propagation about the vertical axis and it still leaves the waves rotarily polarized although not perfectly circularly polarized. For many purposes where rotary polarization is desired it is not important that such polarization be perfectly circular. In case however it is desired to make the polarization as nearly circular as possible, then, especially if ultra short waves are employed, an absorbing network of resistance wires may be laid out beneath the antenna as shown at 12, to absorb the energy that would otherwise be reflected by the earth. The resistance will of course be chosen not so high that no appreciable currents will be produced therein, but on the other hand not so low that the absorbing network will itself act as a reflector. The theory of wave absorption without reflection is well known and need not be elaborated here. However, it will be found that such an absorbing arrangement will not entirely avoid the distorting effects of reflection, and therefore as a final step in making the emitted wave as nearly circular as possible the relative amplitudes and phases of the currents in the two antennae may be adjusted by cut and try to obtain the most nearly circular polarization as measured at the particular distant point where circularity is most desired.

Figure 2 shows a unitary antenna for transmitting rotary waves. This antenna consists of a loop portion L and a concentric open radiator V connected in series and arranged on a common vertical axis. The ends of the open portion may be provided with capacity elements such as a series of wires radiating outwardly. The entire structure is preferably so dimensioned as to be resonant at the frequency to be transmitted and may be driven by a balanced two wire transmission line 5, 6 tapped across the loop at equal distances from its center.

Since current of the same phase flows through both the loop and open parts of the antenna of Figure 2 it follows that the waves radiated from the two parts are in time quadrature at distant points. Thus, with this type of antenna it is only necessary to so choose the relative dimensions of the two portions that for a given current the same field strength will be produced by each at distant points. The advantage of the capacity loading at the ends of the open antenna is that the open portions may be shortened as much as necessary to reduce the field radiated from the open part to equality with that radiated from the loop, while at the same time the entire structure may be maintained resonant to the transmitted frequency by increasing the loading capacities.

I claim:

1. In a directive signalling system a source of wave energy, one or more turns of conducting material forming a radiating system the plane of which is parallel to the earth's surface, linear conductors connected with each end of said conducting material and located in the axis of said turns, said turns and linear conductors being jointly tuned to the frequency of the wave energy of said source, and means for coupling said source of wave energy to said conductor.

2. An antenna structure comprising an open-ended loop portion arranged when energized, to radiate waves polarized in one plane, the ends of said open ended loop portion terminating in linear conductor members adapted to radiate waves polarized in a different plane and having substantially different time phase with respect to said first named waves, and a source of wave energy coupled to said structure.

3. A system as recited in claim 2 in which an absorbing network is located in a plane parallel with said open-ended loop portion.

WALTER van B. ROBERTS.